(12) United States Patent
Hanagan

(10) Patent No.: US 6,676,193 B1
(45) Date of Patent: Jan. 13, 2004

(54) VEHICLE WITH UPWARDLY PIVOTING DOOR

(75) Inventor: Michael W. Hanagan, Hollister, CA (US)

(73) Assignee: Corbin Pacific, Inc., Hollister, CA (US)

( * ) Notice: Subject to any disclaimer, the term of this patent is extended or adjusted under 35 U.S.C. 154(b) by 0 days.

(21) Appl. No.: 10/341,301

(22) Filed: Jan. 13, 2003

(51) Int. Cl.$^7$ .................................................. B60J 1/08
(52) U.S. Cl. ................................... 296/146.11; 296/202
(58) Field of Search ..................... 296/146.1, 146.11, 296/202, 190.11

(56) References Cited

U.S. PATENT DOCUMENTS

| 3,589,069 | A | * | 6/1971 | Lecomte ..................... 49/257 |
| 3,693,997 | A | * | 9/1972 | Dreyer ........................ 280/775 |
| 6,030,025 | A |   | 2/2000 | Kanerva |
| 6,086,137 | A | * | 7/2000 | Leschke et al. .......... 296/146.1 |

FOREIGN PATENT DOCUMENTS

| DE | 4206288 | * | 9/1993 |
| DE | 4319662 | * | 12/1994 |
| EP | 0493225 | * | 12/1991 |
| EP | 0493225 |   | 7/1992 |
| FR | 2380911 |   | 6/1993 |
| FR | 2694244 |   | 2/1994 |
| FR | 2694244 | * | 5/1994 |
| FR | 2699126 | * | 6/1994 |
| JP | 63-57327 | * | 3/1988 |

* cited by examiner

*Primary Examiner*—Joseph D. Pape

(57) ABSTRACT

A vehicle has a chassis providing a drier compartment and includes a door frame about an opening into the driver compartment. A door is cooperatively dimensioned and configured to close the opening, and is pivotably mounted on the door on the forward portion of the door frame by a hinge. The hinge includes a pivot pin having a pivot axis angled rearwardly and outwardly. The door pivots upwardly and forwardly about the pivot pin during opening movement. Upward opening of the door is facilitated by the inclusion of a spring arragement biasing the door into an open position.

16 Claims, 7 Drawing Sheets

VEHICLE WITH UPWARDLY PIVOTING DOOR

BACKGROUND OF THE INVENTION

The present invention relates to vehicles, and, more particularly, to vehicles having upwardly pivoting side doors.

There is a demand for low and zero emissions commuter vehicles in areas with significant air pollution, such as large cities in California. Such vehicles offer an additional advantage for urban use in that they can fit into somewhat smaller parking spaces than conventional automobiles. However, drivers of such vehicles often will be required to park in traditional automobile-sized parking spaces, thereby resulting in an inefficient use of crowded city parking lots and garages. It would be useful to develop a commuter vehicle that is sufficiently compact to fit within narrow parking spaces such as those traditionally reserved for motorcycles.

An object of the invention is to provide an enclosed vehicle that can conveniently park within a motorcycle-sized parking space.

Another object of the invention is to provide a compact vehicle with an upwardly opening side door that is easily opened by the driver.

Yet another object of the invention is to provide a vehicle that requires a minimal amount of space beside the entry door for driver access and egress.

Another object of the invention is to provide such a vehicle that is safe and relatively inexpensive to produce.

SUMMARY OF THE INVENTION

It has now been found that the foregoing and related objects may be readily attained in a vehicle comprising a chassis providing a passenger compartment and including a door frame about an opening into the passenger compartment, a door cooperatively dimensioned and configured to close the opening, and a hinge pivotably mounting the door on the forward portion of the door frame. The hinge includes a pivot pin having a pivot axis angled rearwardly and outwardly, and the door pivots upwardly and forwardly about the pin during opening movement.

Desirably, torsion spring means are included about the pivot pin biasing the door into an open position. The vehicle preferably includes second biasing means connected between the frame and the door rearwardly of the pivot pin, the biasing means augment the spring means. Usually, the second biasing means is a gas spring.

The door desirably includes a frame member extending over substantially the length of the door. The pivot pin and second biasing means are connected to the frame member.

The door frame and opening preferably are angled rearwardly and inwardly. Upon initial opening movement of the door, the upper rear edge portion of the door preferably moves outwardly from the frame. Thereafter, the door moves substantially in a vertical plane.

In one preferred form of the invention, the pivot axis of the pivot pin is angled downwardly in the outward direction. Desirably, the hinge is mounted on the upper end of the forward portion of the door frame. Spring means preferably are included biasing the door into an open position.

DETAILED DESCRIPTION OF THE PREFERRED EMBODIMENT

The present invention derives from the recognition that parking efficiency is an advantageous feature of a commuter vehicle in order to provide convenient city parking for a large number of drivers and to reduce the parking cost per driver. By producing and employing a commuter vehicle with an upwardly opening side door for the driver, less spaces required adjacent the side of the vehicle and an increase in parking capacity can be achieved as compared to parking space requirements for conventional automobiles.

The invention employs a novel hinge system which enables the driver to easily and conveniently open and close the side door of the vehicle by pivoting it in a generally vertical direction. By employing a door hinge having a pivot axis angled rearwardly and outwardly, and preferably also downwardly and outwardly, the driver can move the door upwardly after removing only the upper edge of the door from the door frame. A metal coil spring or the like which biases the door upwardly can be combined with the hinge. With this combination, the driver can open the door using the weight compensation provided by the spring and can close the door with the help of gravitational forces. The opening and closing of the door can be further facilitated by the use of a second spring connected between the door and the door frame which biases the door into an open position.

Figure 1:
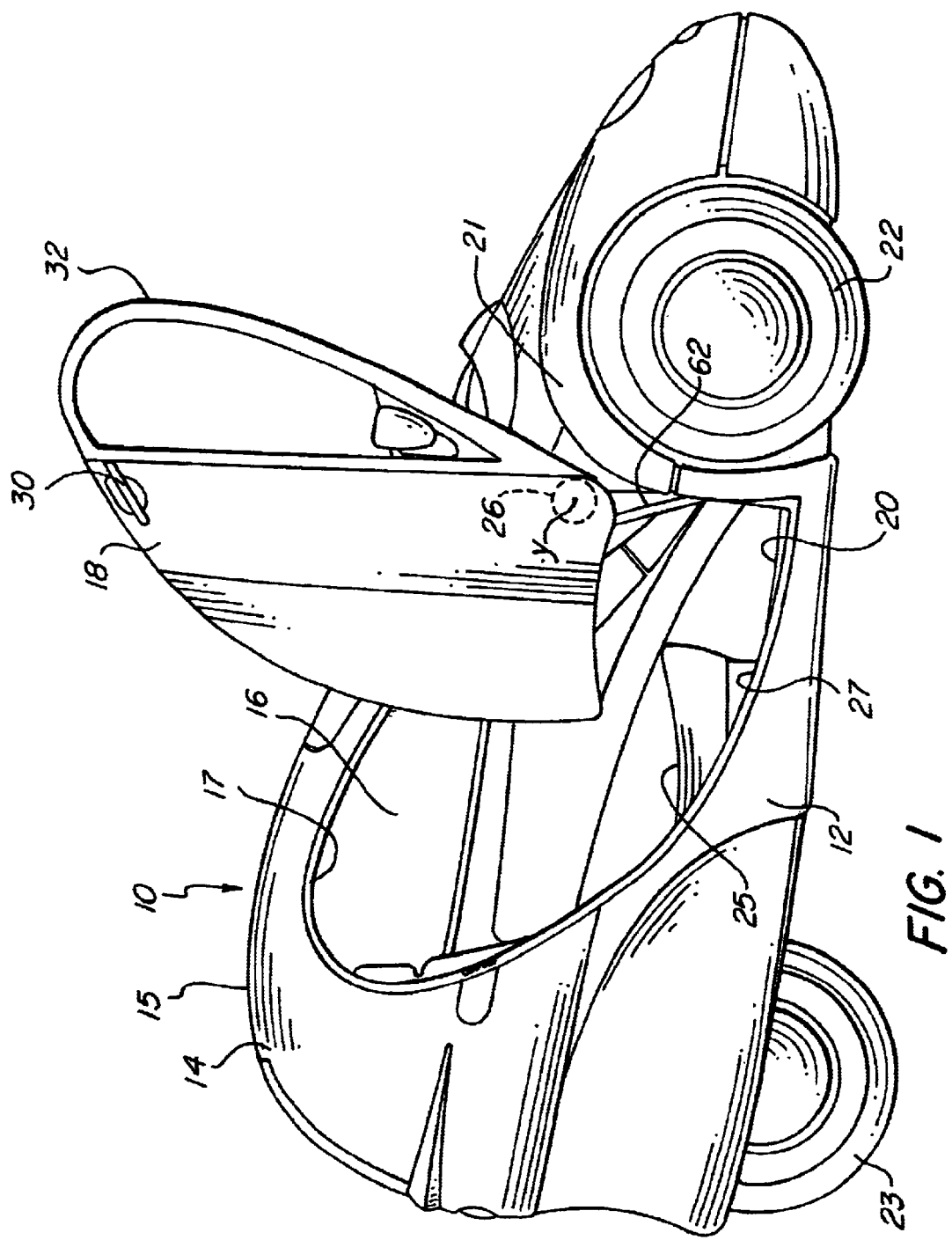
FIG. 1 is a side elevational view of a vehicle embodying the present invention with the side door being shown in an open position.
Figure 2:
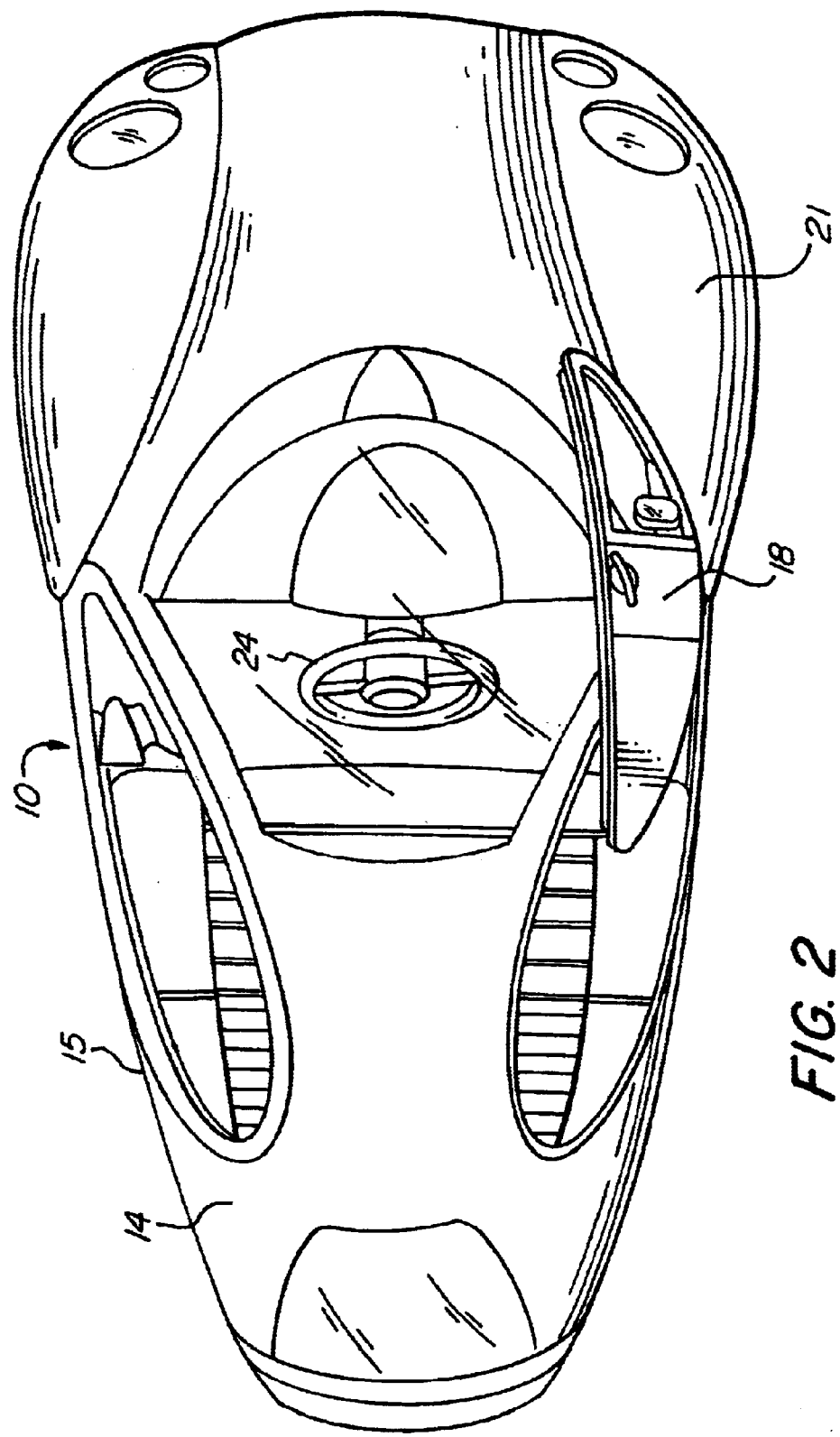
FIG. 2 is a top plan view of the vehicle of FIG. 1.
Figure 3:
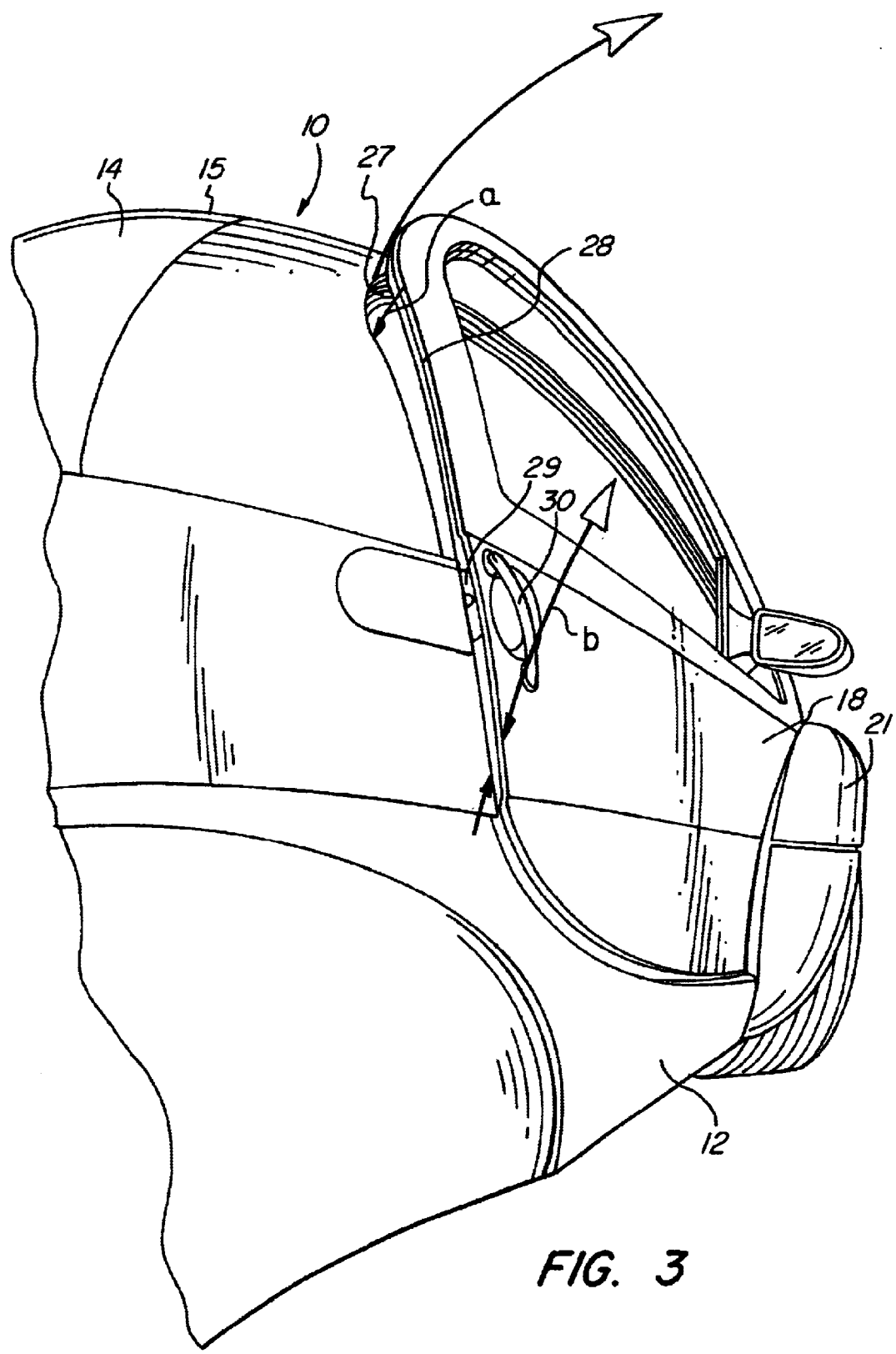
FIG. 3 is a fragmentary perspective view of the vehicle showing the pivoting of the door as it opens.

Turning first to FIGS. 1–3 of the attached drawings, therein illustrated is a commuter vehicle with an upwardly pivoting door embodying the present invention, the vehicle being generally designated by the numeral 10. The vehicle 10 has a chassis and lower body 12 and an upper body 14 which together form a vehicle body 15, and the principal components are typically made of fiberglass. The chassis and lower body 12 is secured to the upper body 14 by bolts and an adhesive (both not shown), as is described and commonly assigned U.S. Pat. No. 5,960,901. The vehicle body 15 preferably gives the driver compartment portion of the car a generally ovoidal egg-shaped configuration which provides for favorable distribution of impact and stress loading, as well as excellent rigidity and favorable aerodynamics.

Figure 5:
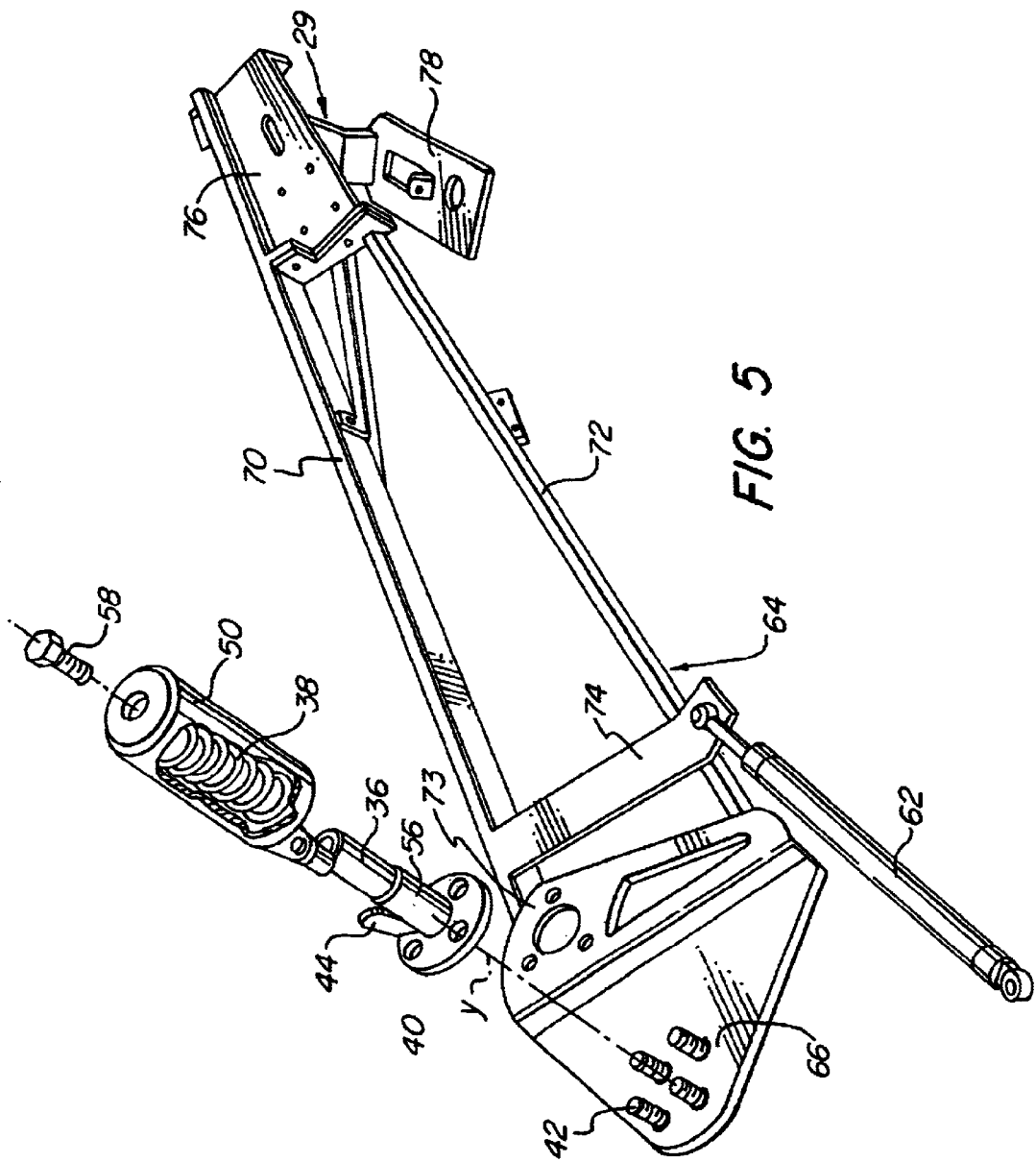
FIG. 5 is a partially exploded perspective view of the door frame and its connections to the hinge and gas spring, with the spring housing tube partially broken away and with certain parts of the hinge assembly being omitted for clarity.
Figure 7:
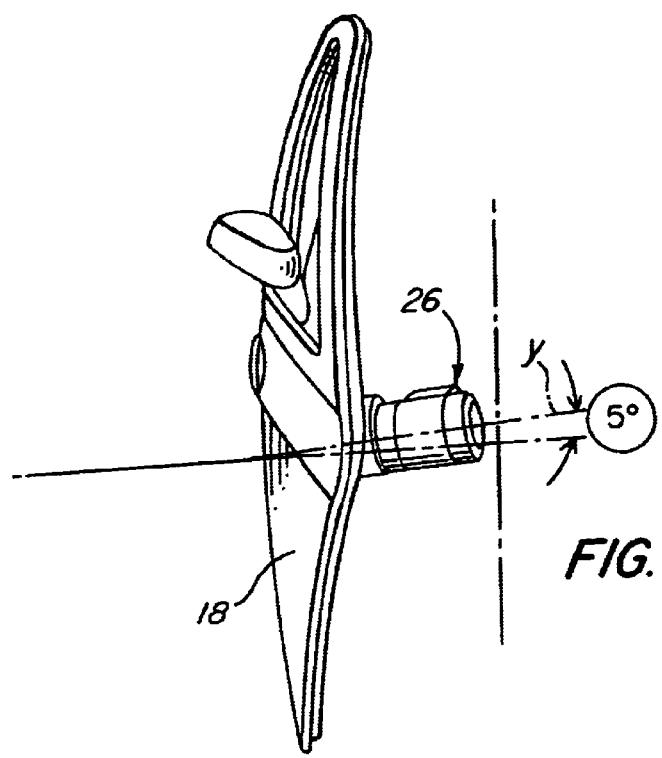
FIG. 7 is a front elevational view of the door and hinge showing the orientation of the axis of the hinge relative to a horizontal plane.
Figure 8:
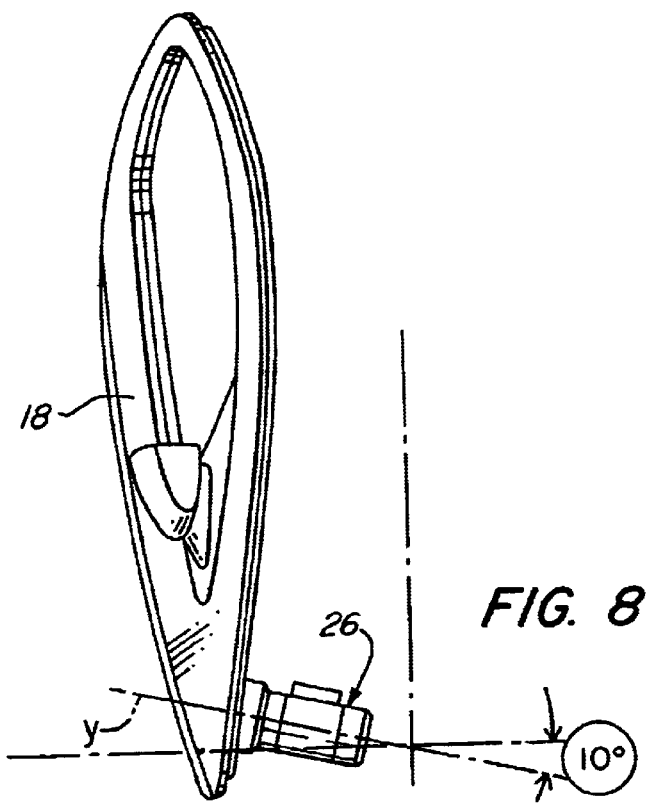
FIG. 8 is a top plan view of the door and hinge showing the orientation of the hinge relative to a vertical plane.

The vehicle body 15 has a generally ovoidal-shaped opening or doorway 16 bordered by a door frame 17. A generally ovoidal-shaped door 18 with a slightly convex cross section designed to conform with the overall configuration of the vehicle 10 is pivotably mounted on the door frame 17 to provide access to a driver compartment 20. The door 18 is mounted above the front right fender 21 on a hinge generally designated by the numeral 26. As shown in FIGS. 5, 7 and 8, the hinge 26 has a pivot axis y that extends rearwardly and outwardly, and preferably also downwardly, thereby enabling the door 18 to be pivoted upwardly and forwardly upon opening. The vehicle has a pair of front wheels 22 and a single rear wheel 23. A steering wheel 24 and driver's seat 25 are positioned in the driver compartment 20.

In the illustrated embodiment of the invention, in only a single door 18 is provided in a one-passenger vehicle 10 in order to maximize the chassis strength and to simplify construction. The door 18 is on the right side of the vehicle 10 to maintain maximum impact resistance on the left side of the vehicle 10 because statistics show that the majority of collisions involve impact on the left side of a vehicle. In addition, the right side location is on the sidewalk side in right-hand drive countries. In left-hand drive countries, the location of the door 18 will be on the left side for the same reasons. Moreover, having only one door reduces weight and cost and increases the strength of the generally spheroidal configuration of the vehicle 10 and improves its aerodynamics.

As shown in FIG. 3, the door frame 17 has an outwardly stepped peripheral edge portion 27 corresponding to a stepped peripheral edge portion 28 on the door 18 so that the door seal is covered when the door 18 is closed. The stepped design also would prevent the door from entering the vehicle compartment if an accident occurred.

In order to open the door 18, the latch mechanism 29, which is centrally located along the rear end of the door 18 is disengaged by pivoting the handle 30. The upper rear corner 32 of the door is then removed outwardly from the body 14 from the door frame 17 as it moves slightly upwardly and outwardly as shown by arrow a in FIG. 3. The entire door 18 then pivots upwardly and forwardly in the direction of arrow b around a pivot axis 36 defined by a tubular pivot pin 36 in hinge 26 in order to provide driver access and egress through the doorway 16. Because the door 18 opens upwardly, rather than outwardly, the vehicle 10 can be parked close to another vehicle, such as a car or motorcycle, or beside a wall or other barrier. The space requirements are determined only by the necessary amount of standing room for the driver when he or she enters and exits the vehicle. This is in contrast to conventional car doors which open outwardly and require not only standing space for the driver but also space beside the driver for the door itself.

Figure 4:
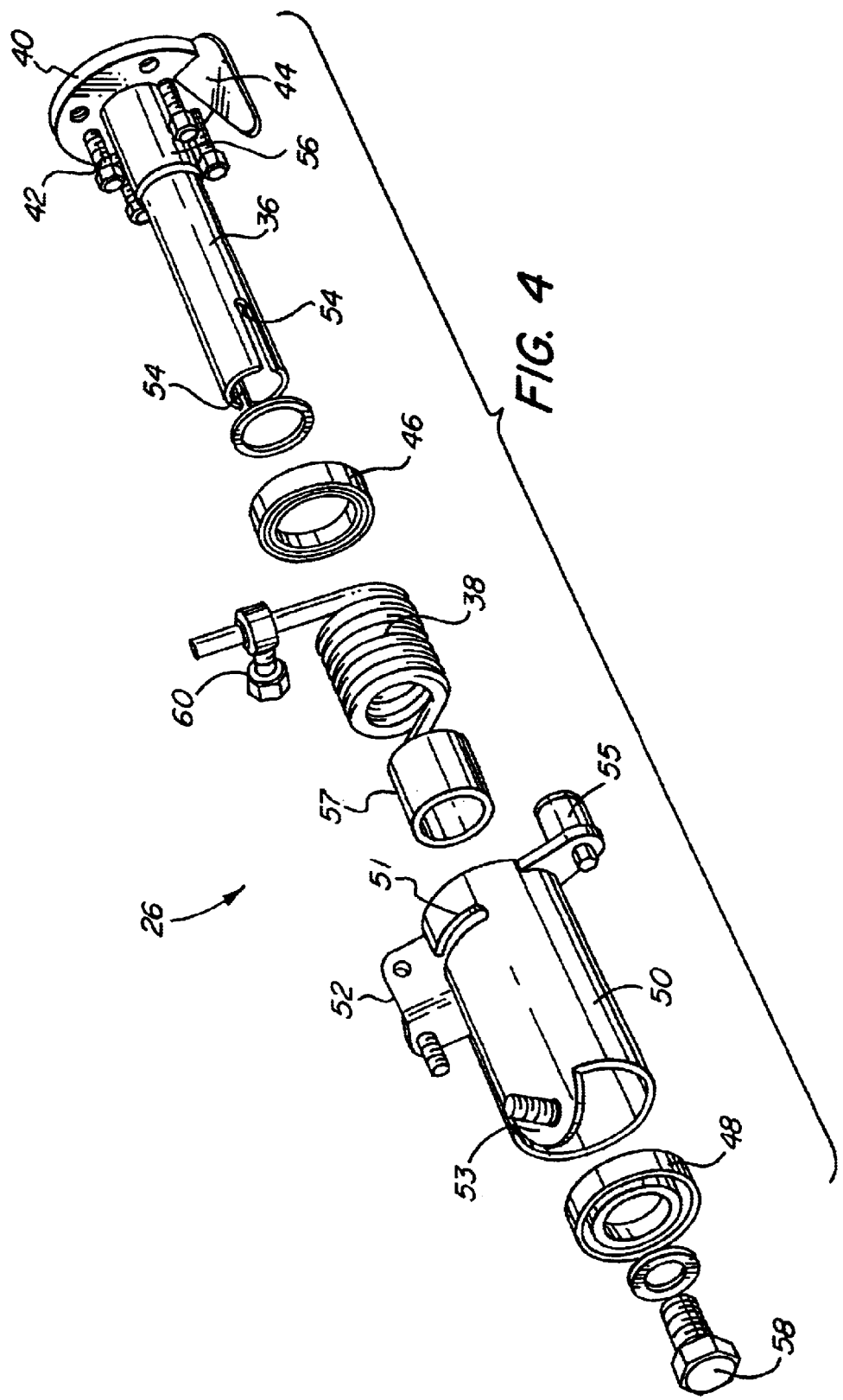
FIG. 4 is an exploded view of the hinge supporting the door.

To compensate for the weight of the door 18, thereby enabling the driver to easily open the door upwardly, the hinge 26 includes a coil spring 38 around the pivot pin 36 which biases the door 18 upwardly into open position. As is shown in FIG. 4, the hinge 26 includes an annular door mount disk 40 which is bolted to the door 18 by the bolts 42. The disk 40 supports an stop arm 44 which stops the upward and forward pivotal movement of the door 18 at the fully open position. The pivot pin 36 is welded to and extends inwardly from the center of the door mount disk 40, providing the axis of rotation for the door 18. The coil spring 38 is disposed about the pivot pin 36 and is sandwiched between bushings 46, 48. A tubular housing 50 surrounds and protects the spring 38 and bushings 46, 48. The outer end of the tubular housing 50 has a slot 51 extending along a portion of its periphery through which the outer end of the spring 38 extends radially. The inner end of the spring 38 is supported in a pair of longitudinal slots 54 formed on the inner end of the pivot pin 36.

The tubular housing 50, has a mounting bracket 52, and a boss 53 formed thereon for mounting the hinge 26 to the frame 17 and a radially outwardly extending stop 55 is provided on its outer end. The stop 55 abuts the stop arm 44 when the door 18 is in the fully open position. The pivot pin 36 has an enlarged outer diameter portion 56 adjacent its outer end of the pivot pin 36 to space the tubular housing 50 and the bushing 46 away from the door mount disk 40 a distance corresponding to the length of the stop arm 44. The tubular spacer 57 fits over the inner end of the pivot pin 36 and holds the inner end of spring 38 in slots the 54. A main bolt 58 holds the tubular housing 50 on the inner end of the pivot pin 36. The spring 38 is pretensioned using tensioning element 60.

Further compensation for the weight of the door upon opening is provided by a gas spring 62 which has one end mounted on the door 18 and the other end mounted on the door frame 17. The gas spring 62 augments the door opening assistance provided by the coil spring 38. Furthermore, if either spring happens to break, the other will provide sufficient opening assistance to enable a driver to easily open the door.

Figure 6:
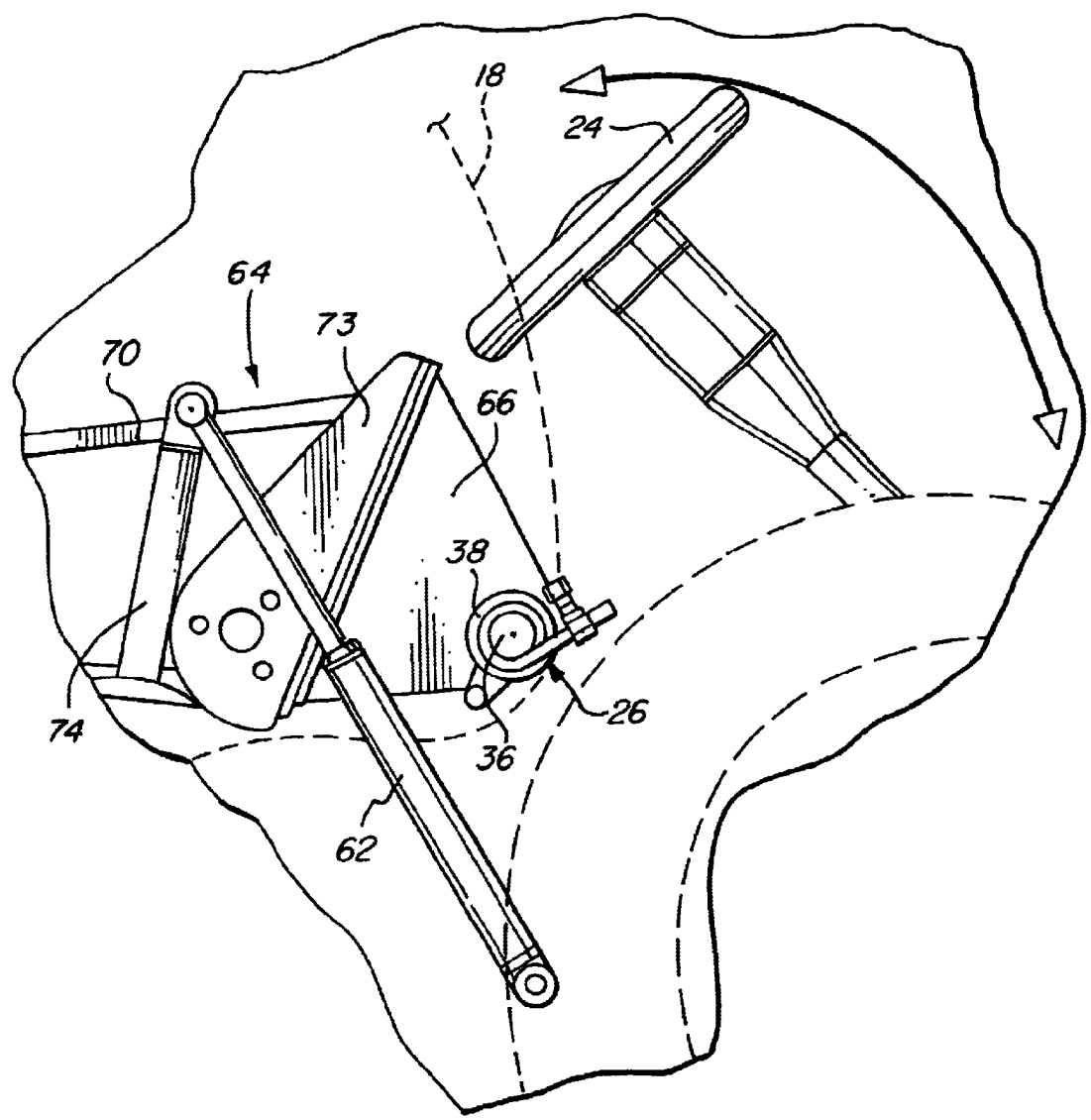
FIG. 6 is a fragmentary side elevational view of the vehicle drawn to an enlarged scale and showing the connection of the gas spring to the door frame, and with the door being shown in phantom line.

FIGS. 4–6 illustrate details of the attachment of the hinge 26 and gas spring 62 to the door and the vehicle body 15. The door 18 has an elongated, metal frame member 64 which extends over substantially the horizontal span of the door 18, thereby imparting rigidity to the door itself and strengthening the connection between the door 18 and both the hinge 26 and gas spring 62. The front end of the frame member 64 includes a plate 66 to which the door mount disk 40 is mounted and a generally parallel but not coplanar plate 73. The frame member 64 also includes longitudinal upper and lower elements 70, 72 which are supported on the plate 73, a transverse element 74 which provides strength to the frame member 64, and a latch support plate 76 at the rear end. The latch support plate 76 supports a conventional door latch mechanism 29 including a latch (not shown) which is configured to removably engage a striker bar or shank (not shown) in the door frame 17, and a bracket 78 upon which the door handle 30 is mounted.

The tubular housing mounting brackets 52 and boss 55 are fixed to the vehicle body 15 at the upper front portion of the door frame 17 above the front fender 21. The lower end of the gas spring 62 is fixed to the door frame 17 below the hinge 26, as is shown in FIG. 6. The upper end of the gas spring 62 is mounted at a location on the door 18 that will facilitate the opening and closing action of the door 18 while not interfering with the driver's ability to enter and exit the vehicle, and typically is mounted to the upper end of the transverse element 74 of the frame member 64.

FIGS. 7 and 8 show particularly preferred angles for the pivot pin 36. When viewed from the front of the vehicle, the axis of the pivot pin most preferably is angled about 4°–60°, and more preferably about 5°, downwardly as it extends outwardly. When viewed from the top, as in FIG. 8, the axis of the pivot pin 36 preferably is angled about 9°–11°, and more preferably about 10°, rearwardly as it extends outwardly. It is noted that the precise angles of the pivot pin 36 will vary somewhat based upon the overall shape and dimension of the vehicle 10 and door 18.

Although the illustrated embodiment uses a single door on a personal (i.e., driver only) vehicle, the door assembly also can be used on a multi-passenger vehicle and in such a case preferably would be used on both sides of the vehicle. Thus, it can be seen from the foregoing detailed description and attached drawings that the vehicle has a novel upwardly pivoting door assembly which combines ease of operation and simplicity of use and installation with the advantage of improved parking efficiency. Furthermore, the door assembly provides an aesthetically pleasing appearance and is economical to fabricate.

Having thus described the invention, what is claimed is:

1. In a vehicle, the combination comprising:
   (a) a chassis providing a driver compartment and including a door frame about an opening into said driver compartment;
   (b) a door cooperatively dimensioned and configured to close said opening;
   (c) a hinge pivotably mounting said door on the forward portion of said door frame, said hinge including a pivot pin having a pivot axis angled rearwardly and outwardly; and
   (d) first biasing means biasing said door upwardly, said door pivoting upwardly and forwardly about said pivot pin during opening movement.

2. The vehicle in accordance with claim 1 wherein said first biasing means includes a torsion spring means about said pivot pin biasing said door into an open position.

3. The vehicle in accordance with claim 2 wherein there is also included second biasing means connected between said door frame and said door rearwardly of said pivot pin, said second biasing means augmenting said spring means.

4. The vehicle in accordance with claim 3 wherein said second biasing means is a gas spring.

5. The vehicle in accordance with claim 1 wherein said door includes a frame member therein extending over substantially the span of the door and said pivot pin and second biasing means are connected to said frame member.

6. The vehicle in accordance with claim 1 wherein said door frame and opening are angled rearwardly and inwardly.

7. The vehicle in accordance with claim 1 wherein, upon initial opening movement of said door, the upper rear edge portion of said door moves outwardly from said frame.

8. The vehicle in accordance with claim 7 wherein said door thereafter moves substantially in a vertical plane.

9. The vehicle in accordance with claim 1 wherein said pivot axis of said pivot pin is angled downwardly in the outward direction.

10. The vehicle in accordance with claim 1 wherein said hinge is mounted on the upper end of said forward portion of said door frame.

11. In a vehicle, the combination comprising:
    (a) a chassis providing a driver compartment and including a door frame about an opening into said driver compartment;
    (b) a door cooperatively dimensioned and configured to close said opening, said door frame and opening being angled rearwardly and inwardly;
    (c) a hinge pivotably mounting said door on the upper end of said forward portion of said door frame, said hinge including a pivot pin having a pivot axis angled rearwardly and outwardly, said pivot pin also being angled downwardly in the outward direction; and
    (d) first biasing means biasing said door upwardly, said door pivoting upwardly and forwardly about said pin during opening movement.

12. The vehicle in accordance with claim 11 wherein said first biasing means includes a torsion spring means about said pivot pin biasing said door into an open position.

13. The vehicle in accordance with claim 11 wherein there is also included second biasing means connected between said door frame and said door rearwardly of said pivot pin, said second biasing means augmenting said spring means.

14. The vehicle in accordance with claim 13 wherein said second biasing means is a gas spring.

15. The vehicle in accordance with claim 11 wherein said door includes a frame member therein extending over substantially the span of the door and wherein said pivot pin and second biasing means are connected to said frame member.

16. The vehicle in accordance with claim 11 wherein, upon initial opening movement of said door, the upper rear edge portion of said door moves outwardly from said frame and the door thereafter moves substantially in a vertical plane.

* * * * *